United States Patent [19]

Jago

[11] 3,989,533
[45] Nov. 2, 1976

[54] COMPOSITION FOR USE IN FORMING HEAT INSULATING HOT TOP LINERS AND METHOD OF MAKING SAME

[75] Inventor: Edward John Jago, Berea, Ohio

[73] Assignee: Foseco International Limited, England

[22] Filed: Sept. 13, 1974

[21] Appl. No.: 505,772

Related U.S. Application Data

[63] Continuation of Ser. No. 242,746, April 10, 1972, abandoned, which is a continuation of Ser. No. 740,036, June 26, 1968, abandoned.

[52] U.S. Cl. .................................... 106/55; 106/57; 106/58; 106/63; 106/65; 106/66; 106/69
[51] Int. Cl.² ........................................ C04B 35/80
[58] Field of Search ................. 106/55, 65, 69, 57, 106/58, 63, 66

[56] References Cited
UNITED STATES PATENTS 2,811,457 10/1957 Speil et al. ........................ 106/69
3,253,936 5/1966 Weindel ............................. 106/69
3,770,466 11/1973 Wilton .............................. 106/65

Primary Examiner—J. Poer
Attorney, Agent, or Firm—Leydig, Voit, Osann, Mayer & Holt

[57] ABSTRACT

A composition for use in forming a heat insulating hot top liner which comprises, by weight, 0 to 20% of a pulverized organic fibrous material, 0 to 40% of a pulverized inorganic fibrous material, 50 to 90% of a refractory material and sufficient liquid carrier to prevent dusting, with the total per cent of the fibrous materials ranging from 5 to 50%. A method for making the insulating composition and a method for making a liner for a hot top which includes transporting the composition to a remote location for forming are also disclosed.

9 Claims, No Drawings

COMPOSITION FOR USE IN FORMING HEAT INSULATING HOT TOP LINERS AND METHOD OF MAKING SAME

This is a continuation of application Ser. No. 242,746, filed Apr. 10, 1972, now abandoned; which is, in turn, a continuation of Ser. No. 740,036, filed June 26, 1968, now abandoned.

This invention relates generally to the art of hot topping and, more particularly, to improved compositions, and methods for forming the same, that contain only a sufficient amount of a liquid carrier to prevent dust problems so as to minimize shipping and storage costs yet may be used in the cyclic forming of heat insulating liners by merely adding enough liquid carrier to reach the level needed for the forming process.

In the casting of metal ingots, it is common practice to use a hot top mounted on or at the top of an ingot mould for the purpose of containing "feed" or "head" metal and maintaining it molten while the metal in the ingot mould is solidifying. The metal in the hot top is above and in contact with the metal in the ingot mould so that as the metal in the ingot mould shrinks, the feed metal feeds down into the ingot body and thus prevents the formation of shrinkage cavities in the body of the ingot.

The latest type of hot top in commerical use comprises a single metal casting, preferably in the form of a one-piece casting, and a heat insulating liner on the inner surface of the casing. The casing iself is reusable, but the insulating liner must be replaced after each use, i.e. — after the casting of each ingot. The liner is generally made of a relatively low cost composition having good heat insulating properties, the composition being preformed in self-supporting slabs or sleeves shaped to fit the particular casing in which they are to be used. After each use of the hot top, the remnants of the used liner, which usually disintegrates to some extent during the casting operation, are then removed from the metal casing and replaced by a new preformed liner.

Typically, the relining operation includes setting preformed liners in the shape of individual slabs in the casing and driving four slabs down along the four inside walls of the casing with the slabs being wedged against each other in the corners so as to urge the slabs against the casing walls.

Because this method, while a vast improvement over prior methods, is still a time-consuming operation, considerable effort has been directed towards developing a method which can form an insulating liner in situ with a configuration which renders the liner self-retaining against the hot top casing. Such a method has now been developed and is described in U.S. Pat. No. 3,384,149, issued May 21, 1968, entitled "Method For Forming Hot Top Liners", and assigned to the assignee of this invention.

In accordance with that method, a slurry of a refractory material, a fibrous material and a liquid carrier such as water is fed into an annular cavity formed between the inner surface of the hot top casing and the outer surface of a perforated forming tool. The liquid carrier is withdrawn through the interior of the forming tool so as to build up a layer of the fibrous and refractory materials in the cavity. The forming tool is then withdrawn from the casing in such a manner that the layer of fibrous and refractory materials forms a liner on the inner surface of the casing.

The slurry used in forming the liner generally comprises about 80 to 90% by weight of the liquid carrier. As disclosed in Davidson U.S. Pat. Re. 25,915, the organic fibrous material that is used may be mechanical pulp or pulp manufactured from waste paper and refractory material in a finely divided state can be added to the pulp slurry to provide the desired consistency. The pulp facilitates the binding of the refractory material and also provides the liner with a porosity which substantially increases its insulation qualities.

Unfortunately, the users of hot tops almost uniformly do not have facilities for carrying out mechanical pulping. Also, it would generally be impractical to install all the facilities needed to form a slurry that could be employed in the method for forming a liner in situ as described in the hereinbefore identified patent. It is accordingly necessary to transport or ship to the hot top user a sufficient amount of the liner composition for carrying out the several hundred or even thousands of relining operations that may well take place in one day.

Shipping a slurry composition containing about 80% by weight of a liquid carrier such as water is obviously expensive and does not offer a practical solution to the problem of providing an economical source of the lining composition. It would thus be highly advantageous to provide a lining composition containing only a minimum amount of liquid carrier which could be shipped to a hot top user and employed by merely adding enough liquid carrier to form the process slurry for the method for forming liners in situ disclosed in the aforementioned patent.

It is, therefore, a primary object of the present invention to provide a hot topping composition, and a method for manufacturing same, that contains only a sufficient amount of a liquid carrier to prevent dust problems yet is capable of forming a slurry without any substantial caking or agglomerating by merely adding liquid carrier.

Another object includes the provision of a liner composition for hot tops which minimizes shipping and storage expenses.

A further aspect of the present invention provides a composition that may be used to form liners for hot tops having insulation properties equal or superior to those achieved by a composition utilizing fibrous material obtained from a mechanical pulp slurry.

Other objects and advantages of the invention will become apparent from the following description:

While the invention is described in connection with certain preferred embodiments, it will be understood that it is not thereby intended to limit the invention to those embodiments. On the contrary, it is intended to cover all alternatives, modifications, and equivalents as may be included within the spirit and scope of the invention and defined by the appended claims.

To form a lining composition containing only a minimum amount of liquid carrier so as to minimize shipping costs, mechanical pulp slurries of the type employed in the in situ method of forming hot top liners as set forth in the hereinbefore identified patent were used. Various means such as, for example, air drying were used to remove a substantial portion of the liquid carrier.

However, when the water content was reduced below about 50% by weight, caking and agglomeration of the fibers resulted. The subsequent addition of a liquid carrier to the dried pulp slurry required that a mechanical dispersing step, similar to mechanical pulping itself, be carried out. It was thus necessary to develop a method that could provide a composition having properties at least equal to lining compositions formed from a mechanical pulp slurry without in fact employing such a pulp slurry in the forming process.

In accordance with the present invention, it was discovered that compositions for use in forming heat insulating hot top liners with superior properties — yet without the disadvantages associated with the use of mechanical pulp slurries — could be made by pulverizing the fibrous components of the composition in the relative absence of water or any other liquid carrier. The thus comminuted fibrous components may be then mixed or blended with a finely divided refractory aggregate in the presence of an amount of liquid carrier sufficient to prevent dusting to form an intimate mixture with minimum density. Any other optional ingredients conventionally added to lining compositions such as, for example, a binder, can be included by addition during the mixing operation.

The pulverizing operation can be carried out in a conventional hammer mill, ball mill or the like. The fibrous ingredients are thereby reduced to short lengths or flakes that are later amenable by subsequent mixing with a liquid carrier to form a dispersion without the necessity of employing excessive energy such as is required to break up an agglomerated fibrous mixture. By way of illustration, it has been found suitable to equip a hammer mill or ball mill with a screen having openings from about ⅛ inch to ½ inch. The pulverized material obtained from such mills are not individual elements but are usually present as a conglomeration of several fibers. A size of about 1 to 3 millimeters generally characterizes the pulverized material. While it is desirable to pulverize all fibrous components in accordance with this invention, any fibrous material (such as asbestos) that can be purchased already in a pulverized state need not be further processed.

The improved heat insulating composition of this invention comprises, by weight, pulverized organic fiber present in an amount from 0 to about 20%, pulverized inorganic fiber present in an amount from 0 to about 40%, refractory aggregate present in the range of from about 50 to about 90% and sufficient liquid carrier to prevent dusting. A range of from about 1 to about 20% by weight has been found to be suitable for the carrier. Optionally, a binder for the other components may be added in an amount of up to about 20%. The particular proportion of inorganic fibrous material and organic fibrous material that are employed may be varied to provide the degree of insulation and formability desired. Indeed, depending on the properties desired, it may be necessary to employ only a single fibrous material, i.e. — either organic or inorganic. However, the total content of the fibrous ingredients should not be lower than a minimum of 5% by weight and a maximum of about 50% by weight to insure good permeability and insulation but retain minimal penetration by the molten metal.

With regard to the specific materials that are used for the components of the present composition, any refractory material previously used for hot top liners may be employed. Suitable examples include alumina, silica, aluminum silicates, magnesium silicate, chromite zirconia, ball mill dust, zirconium silicate, magnesium oxide, dolomite and limestone. Among the inorganic fibrous materials that may be used are asbestos, slag wool, aluminum silicates and silica. For the organic fibrous material, any animal or vegetable fibrous material may be used as can sythetic organic compositions such as rayon and nylon. Suitable examples include paper, waste paper or other cellulose fibrous materials such as wood flour, sawdust and cotton linters.

The type of binder that is used and the weight percentage that is employed will be in large part dictated by the particular type of forming operation used for the liner. Indeed, in some instances, a sufficient bond is obtained from the entwining of the fibrous material and additional binder need not be included. When temperature drying conditions between 250° F and 450° F are maintained, suitable binders include urea formaldehyde and phenol formaldehyde resins. When drying temperatures lower or higher than the previous range are used, binders such as colloidal silica, aluminum orthophosphate, sodium silicate and epoxy resins can be employed.

Colloidal silica may be used where a low residual gas content is desired. Aluminum phosphate and colloidal silica can also be employed where molds hotter than 450° F are encountered. Epoxy and other resins capable of setting without heat after addition of a catalyst or accelerator can be employed where molds have temperatures below that necessary to harden other types of binders.

Typically, the liquid carrier that is utilized for the other components of the composition will be water. However, any organic compounds not insoluble with water and having a high evaporation rate at the drying temperature can be employed if production conditions allow. When organic compounds are used, forced air or vacuum drying combined with a condensing system for solvent recovery are economically desirable. Suitable organic compounds include various alcohols, naphthas, chlorinated hydrocarbons and ketones.

To cyclically form hot top liners, the composition of the present invention containing only a minimum amount of liquid carrier is formed by pulverizing the fibrous materials and mixing with the carrier and refractory material to form an intimate mixture. The resulting mixture may then be shipped or otherwise transported to a remote location where the liner will be formed on the hot top casing.

At the location where it is to be used, liquid carrier (not necessarily the same as the one already present) is added to the shipped composition with slight mixing, to form a slurry that may have, for example, 80 to 95% by weight liquid carrier. The slurry can then be used in the method disclosed in U.S. Pat. No. 3,384,149 which method is herein incorporated by reference.

Briefly, this comprises advancing a hot top casing to a fixed lining station and then inserting a perforated forming tool as it arrives at the station so as to form an annular cavity between the inner surface of the casing and the outer surface of the forming tool. The slurry, using the composition of this invention, is fed into the cavity and the liquid carrier is withdrawn through the interior of the perforated forming tool so as to build up a layer of the fibrous and refractory materials in the cavity. The forming tool is then withdrawn in such a manner that the layer forms a liner on the inner surface of the casing. The casing is then moved from the lining station and the liner is dried sufficiently to permit the casting of molten metal in the lined casing.

After the lined hot top has been used in connection with a mould to cast an ingot, the remnants of the used liner can be removed and the casing again advanced to the lining station to complete the operation cycle.

The invention may be further illustrated by means of the following examples which are intended to be illustrative and not in limitation of the scope of the present invention. Unless otherwise indicated, all parts or percentages are by weight.

The properties referred to in the ensueing Examples were determined as follows:

Dispersion time

The time required to obtain a homogeneous slurry

Forming time

The time required to filter 600 cc. of slurry through a 60 mesh screen at 45 p.s.i., which forms a pad built up on the screen.

Green water

The weight percentage of liquid carrier in the pad described in connection with forming time.

Green permeability

A 2 inch diameter specimen is cut from the pad using a rotating blade mounted in a conventional drill press. The specimen is measured and then mounted in a permeability specimen tube described in Section 7, page 13 of the American Foundrymen's Society "Foundry Sand Handbook" and is tested for permeability by following the procedure set forth on pages 2 through 4 of the same publication.

Dry permeability

This is carried out in a manner identical to Green permeability but is determined from a sample that has been dried at 395° F for two hours.

Dry density

The weight per unit volume of the sample dried as described in connection with the dry permeability.

The binder used in Examples 3 through 5 was a phenol formaldehyde resin (composition number 2320 from Varcum Chemical Co.). About 13 to 15% by weight of hexamethylenetetramine is included. The resin has an inclined flow of 15 to 20 mm. at 125° C. A typical screen analysis is as follows: +170 ml, +200— about 1%, and −200—about 99% minimum. The resin is commonly employed as a solid shell core binder in the metal casting industry.

Example 1

A heat insulating composition containing less than at least about 20% water was attempted to be formed by pulping and then drying the pulp slurry.

A ¼ inch layer, 12 × 3 inches, of a waste newsprint mechanical paper slurry (5% solids) was placed on a 60 mesh screen and allowed to air dry at a temperature of about 100° C for 24 hours. After this time, the paper was substantially dry, a hard shell having been formed on the exterior of the dried slurry.

The dried pulped paper was broken up into pieces and stirred into 3½ gallons of water. A conventional Lightnin mixer, using a single blade and operating at about 75 R.P.M., was employed. After eight hours very little paper went back into its fibrous state. One inch pieces of paper and layer were still present. After 24 hours, small pieces of paper approximately ⅛ to ¼ inch were still present.

Example 2

A composition as in Example 1 was attempted to be prepared by partially drying a pulp slurry.

Three pounds of a 5% waste newsprint pulp slurry was weighed out and placed upon a cylindrical shaped screen (6 inches diam. × 4 inches high) to allow drainage.

Drainage was slow; and, after 24 hours, only 16 ounces from a total of about 45½ ounces had been drained. The dimensions of the slurry before drainage was approximately 6 inches diam. × 2½ inches thick (volume — 71 cubic inches). After drainage the thickness was 2 inches (volume — 57 cubic inches).

Example 3

A heat insulating composition containing less that about 20% water was formed by ball milling in accordance with the present invention. Water was then added to form a slurry that can be used to form a hot top liner. The resulting composition was compared to an identical formulation made by adding the other components to a mechanical pulp slurry.

A sample of waste newsprint was passed through a conventional hammer mill having a 3/16 inch screen opening. The collected shredded or pulverized product was added to the composition set forth in Table 1 by mixing with a Day Ribbon Blender:

Table 1

| Component | Per Cent |
|---|---|
| Silica sand ( − 20 + 300 mesh) | 87.5 |
| Pulverized asbestos fiber | 1.5 |
| Waste newsprint | 6.5 |
| Binder | 4.5 |
| Total | 100.0 |

During the mixing, about 17% water to reduce dusting was added to the formulation hereinbefore described.

After being allowed to stand for 24 hours, the mixture was dispersed in sufficient water to provide a solids content of 17%. The properties of the composition formed in accordance with this invention was compared to a standard having an identical formulation which was prepared by adding the silica sand, asbestos fiber, binder and additional water to a 5% paper slurry to form a 17% solids slurry.

Test pads were made by filtration at 45 p.s.i. through a 60 mesh screen. The results are shown in Table 2:

Table 2

| Properties | Standard | Present Invention |
|---|---|---|
| Dispersion time required | 30 minutes* | 2 minutes |
| Forming time | 23 seconds | 23 seconds |
| Green water | 34.4 | 23.1 |
| Green permeability | 1.2 units | 3.0 units |
| Drying time required | 2 hours | 1 – 1½ hours |
| Dry permeability | 4.8 units | 3.7 units |
| Dry density | 0.88 gms/cc. | 0.87 gms/cc. |

*20 minutes to pulp paper and 10 minutes thereafter to form the dispersion.

Example 4

Example 3 was repeated except that the paper employed consisted of waste cardboard boxes.

The results are shown in Table 3:

Table 3

| Properties | Standard | Present Invention |
|---|---|---|
| Dispersion time required | 30 minutes* | 2 minutes |
| Forming time | 23 seconds | 23 seconds |
| Green water | 34.4 | 20.5 |
| Green permeability | 1.2 units | 2.0 units |
| Drying time required | 2 hours | 1½ hours |

Table 3-continued

| Properties | Standard | Present Invention |
|---|---|---|
| Dry density | 0.88 gms/cc. | 0.89 gms/cc. |

*20 minutes to pulp paper and 10 minutes thereafter to form the dispersion.

Example 5

A heat insulating composition as in Example 3 was formed by using only inorganic fibrous elements. These elements were hammermilled using a ¼ inch mesh screen and the collected product was dispersed into a composition formulated as in Table 4 below by mixing with a Day Ribbon Blender:

Table 4

| Component | Percentage |
|---|---|
| Silica sand ( − 20 + 300 mesh) | 83 |
| Asbestos fiber | 6 |
| Slag wool | 5 |
| Binder | 6 |
| Total | 100 |

During the mixing 14% water was added to eliminate dusting.

After standing for 24 hours, the composition was dispersed.

A comparison was made with an identical formulation, which was prepared directly by pulping in water, i.e. the asbestos and slag wool were pulped at approximately a 4% concentration in water for 5 minutes. The silica sand and binder were then added and pulping was continued for an additional 5 minutes.

The results are shown in Table 5:

Table 5

| Properties | Standard | Present Invention |
|---|---|---|
| Dispersion time required | 10 minutes | 2 minutes |
| Forming time | 23 seconds | 23 seconds |
| Green water | 19.1 | 18 |
| Green permeability | 2.4 units | 3.5 units |
| Drying time required | 1½ hours | 1½ hours |
| Dry density | 0.96 gms/cc. | 0.98 gms/cc. |

From Examples 1 and 2, it can be seen that the use of a pulp slurry that is dried to reduce the water content does not provide a practical solution to forming a composition for use in making a heat insulating liner which contains a minimum amount of water for shipping yet which can be readily dispersed to form a slurry. Not only is the time required to reduce the water content prohibitively long but the dried, agglomerated product can only be re-dispersed into its fibrous state after an excessive amount of time, even with extreme mechanical stirring being used.

In contrast, Examples 3 through 5 demonstrate that the pulverized, low liquid carrier composition of the present invention has properties that are equal to or superior to those achieved by the standard method of forming a slurry composition. i.e. — prepared directly by pulping in water. Indeed, the relatively low dispersion time and the low green water content characterize a composition that can be economically used to form a hot top liner.

Thus, the present invention provides an improved composition, a method for making the same, and a method for forming a hot top liner that minimize the shipping, packing and storage costs. Also, a composition is provided that is amenable to subsequent mixing with a liquid carrier such as water and forming to a shaped liner without the necessity of imparting excessive mechanical energy thereto.

The term "pulverized", as used in connection with the present invention, is meant to define the degree of fibrillization and comminution produced by mechanically working the organic and inorganic fibrous materials by, for example ball milling or hammer milling. The pulverized product produced by mechanically tearing the fibrous materials will be light and fluffy resembling down feathers or snow flakes yet will still be particulate and capable of screening into definite size fractions by any of the standard screening procedures such as, for example, ASTM. Individual "feathers" or "flakes" are capable of passing a ½ inch screen but probably would not pass a ⅛ inch screen. In contrast to mechanical pulping using water or another similar carrier, the pulverizing operation should take place in a relatively dry state (i.e. — sufficiently dry to avoid caking or balling of the pulverized product, so that the fibers may be later dispersed in a liquid carrier without requiring excessive energy. In most applications it has been found that the water or other liquid carrier content should be maintained less than about 3% by weight during the pulverizing.

I claim as my invention:

1. A composition for use in forming heat insulating liners comprising, by weight, a mixture of 0 to about 20% of a pulverized organic fibrous material, 0 to about 40% of a pulverized inorganic fibrous material, about 50 to about 90% of a particulate refractory material, and only a sufficient amount of a liquid carrier to prevent dusting, with the proviso that the total percent of the pulverized organic and inorganic fibrous materials is from about 5 to about 50%, said mixture being capable of being dispersed to form a slurry by the addition of a liquid carrier.

2. The composition of claim 1 which includes up to about 20% by weight of a binder.

3. The composition of claim 1 wherein said refractory material is a member selected from the group consisting of silica, alumina, aluminum silicates, magnesium silicate, chromite, zirconia, zirconium silicate, magnesium oxide, dolomite, limestone and mixtures thereof.

4. The composition of claim 1 wherein said inorganic fibrous material is a member selected from the group consisting of asbestos, slag wool, aluminum silicates, silica and mixtures thereof.

5. The composition of claim 1 wherein said organic fibrous material is a member selected from the group consisting of animal fibrous materials, vegetable fibrous materials, nylon and mixtures thereof.

6. The composition of claim 2 wherein the fibrous materials present are asbestos and slag wool.

7. The composition of claim 1 wherein said liquid carrier is water.

8. The composition of claim 2 wherein said refractory material is a member selected from the group consisting of silica, alumina, aluminum silicates, magnesium silicate, chromite, zirconia, zirconium silicate, magnesium oxide, dolomite, limestone and mixtures thereof.

9. A method of forming a composition for use in forming heat insulating liners for hot tops which comprises pulverizing in a relatively dry environment a mixture of at least one member selected from the group consisting of organic fibrous materials, inorganic fibrous materials and mixtures thereof and thereafter mixing the pulverized materials with a major percentage of a finely divided refractory material in the presence of only a sufficient amount of a liquid carrier to prevent dusting, said mixture being capable of being dispersed to form a slurry by the addition of a liquid carrier.

* * * * *